May 18, 1937.　　　B. H. BROWALL　　　2,080,529
BRAKE RIGGING OF THE VARIABLE LEVERAGE TYPE
Filed Feb. 25, 1935　　　2 Sheets-Sheet 1
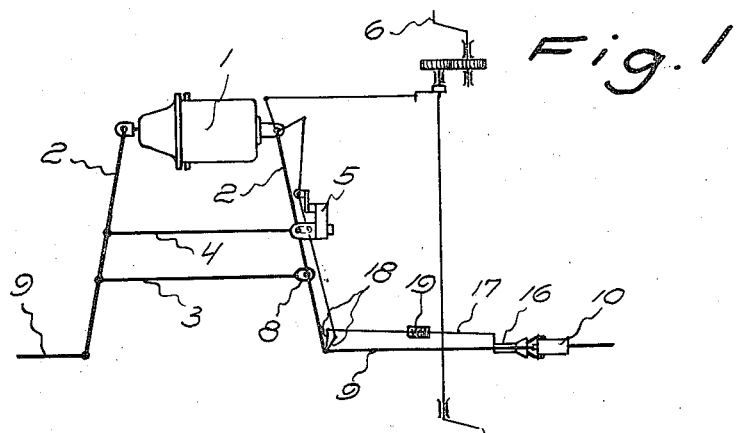
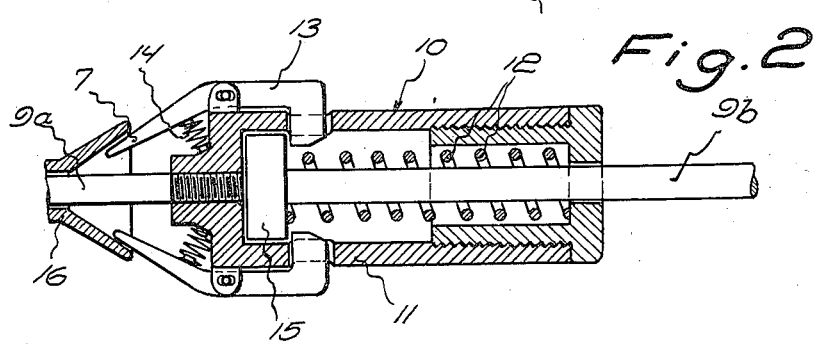
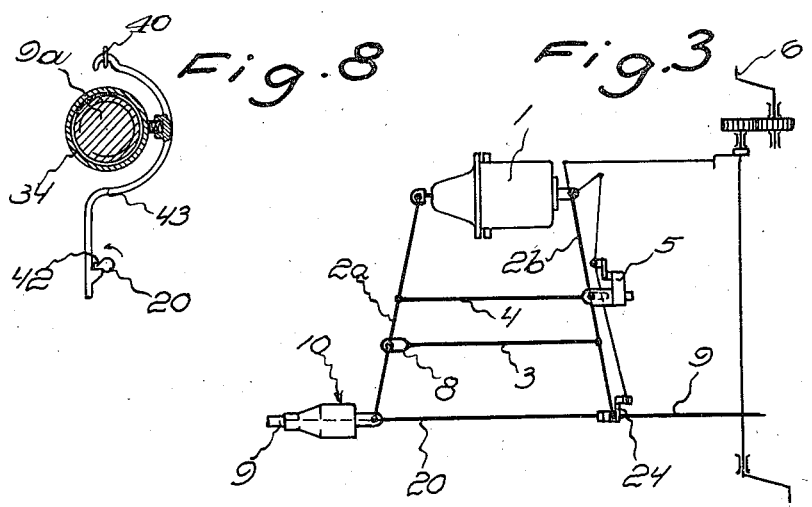
Inventor:—
Bert Henry Browall

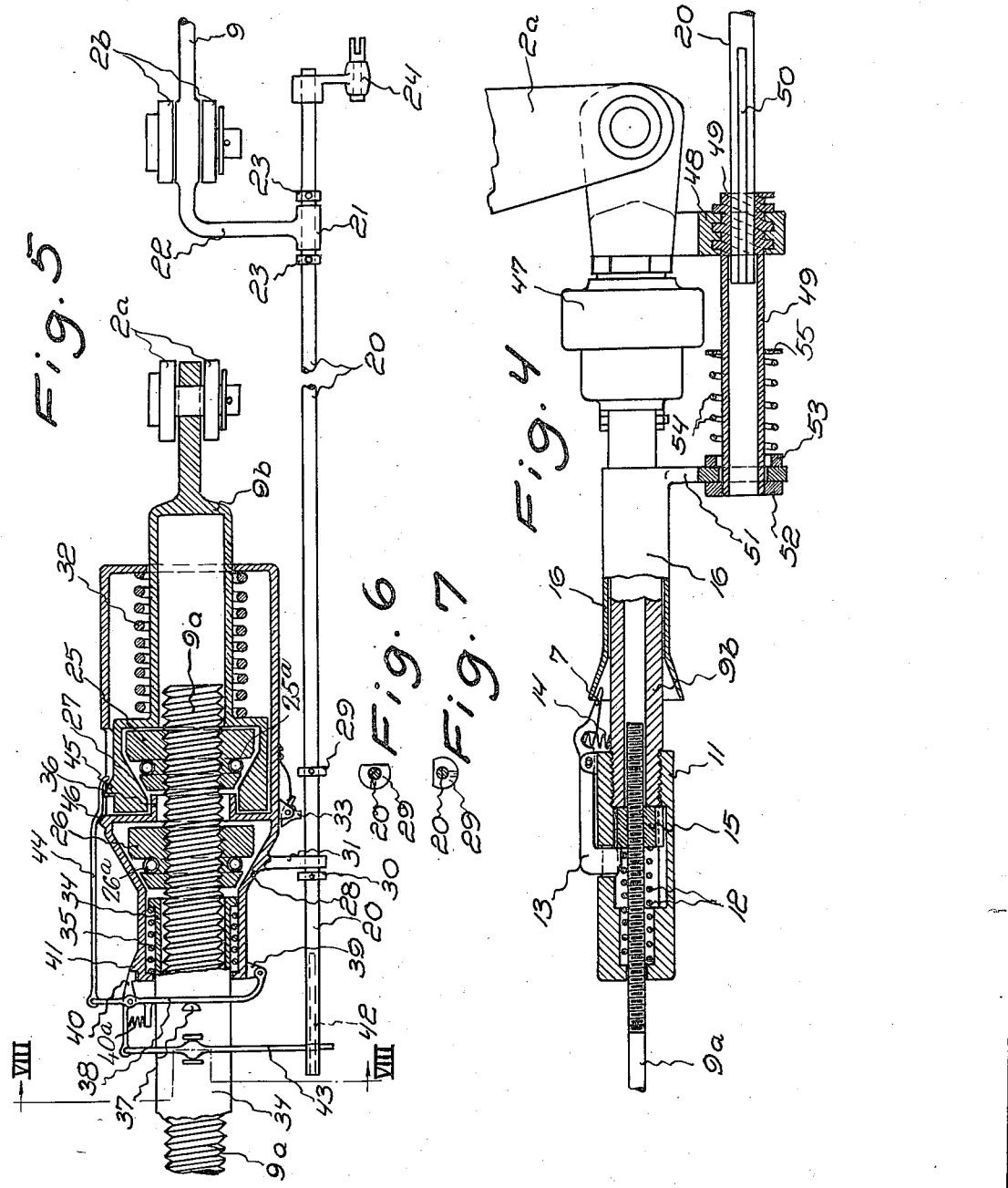

Patented May 18, 1937

2,080,529

UNITED STATES PATENT OFFICE 2,080,529

BRAKE RIGGING OF THE VARIABLE LEVERAGE TYPE

Bert Henry Browall, Malmo, Sweden, assignor to Svenska Aktiebolaget Bromsregulator, Malmo, Sweden, a corporation of Sweden Application February 25, 1935, Serial No. 8,156
In Germany March 7, 1934

7 Claims. (Cl. 188—195)

This invention relates to vehicle brakes, especially railway car brakes, of the type in which the leverage of the brake rigging for transmitting the braking power from the brake piston to the brake shoes is variable for the purpose of accommodating the braking pressure of the brake shoes upon the wheels according to the demands for empty and loaded cars, for instance.

In brakes of this type, in order to maintain substantially the same total brake piston travel when braking at a lower leverage ratio as when braking at a higher leverage ratio, it is known to construct the variable leverage mechanism in such a way that when it is set on the lower leverage ratio this will not become operative at the braking operation until the moment in which the brake piston has travelled over substantially as great a portion of its total braking stroke as is required for applying the brake shoes, that is for moving them into contact with the wheels, when the slacks between the shoes and the wheels in the released position of the brake are of normal value. Until the said moment the brake rigging operates at the higher leverage ratio. If, however, the said slacks, for one reason or the other, are smaller than normally, it takes but a correspondingly smaller portion of the normal brake piston stroke for applying the brake shoes. In such a case it must be feared that the desired transition from high leverage operation to low leverage operation of the brake rigging fails to take place so that the brake rigging will operate at the higher leverage ratio instead of at the lower one not only intentionally during the application of the brake shoes but also unintentionally during the continued travel of the brake piston for pressing the brake shoes against the wheels, so that the braking pressure will be too high and may result in skidding of the wheels. It is known that this risk can be avoided by using an automatic slack adjuster of the double-acting type operating in dependence upon the travel of the brake piston not only for reducing the slacks if they are too great but also for increasing the slacks if they are too small. In such a case the variable leverage mechanism may be adapted, when braking at the lower leverage ratio, to make this ratio operative at any desired point of the application stroke of the brake piston, since the double-acting slack adjuster may be adapted to increase and again reduce the slacks each time as may be required for maintaining substantially the same brake piston travel when braking at the lower leverage ratio as when braking at the higher leverage ratio. It is, however, not on all cars that such a double-acting slack adjuster is used.

Now the present invention has for its object to eliminate the risk referred to above in a simple manner also in such cases where no double-acting automatic slack adjuster but only a single-acting slack adjuster or no automatic slack adjuster at all is used, while maintaining substantially the same brake piston travel when braking at the lower leverage ratio as when braking at the higher leverage ratio. In these cases, in order that the lower leverage ratio shall not fail to become operative even if the slacks between the brake shoes and the wheels are considerably smaller than normally, the transition to the lower leverage ratio must take place at a position in the braking movement in which the brake piston has travelled over a considerably smaller portion only of its stroke than the portion thereof which is required for applying the brake shoes when the slacks between the shoes and the wheels in the released position of the brake are of normal value. Consequently, the brake rigging will operate at the lower leverage ratio already during a considerable portion of the normal application stroke of the brake piston. This fact, however, results in an increased difference between the total brake piston travels when braking at the higher and at the lower leverage ratio. In order to compensate for this difference there is provided, according to the present invention, in the brake rigging a device which is operated in dependence upon the setting of the variable leverage mechanism and produces in the brake rigging, when said mechanism is set on the lower leverage ratio, an additional slack or idle motion which substantially corresponds to and, consequently, removes the difference otherwise turning up between the brake piston travels when braking at the lower and at the higher leverage ratio.

The invention will be explained in the following detailed description with reference to the accompanying drawings which illustrate several practical embodiments thereof to enable others to adopt and use the same; and in the appended claims the generic new features and the novel construction and combination of parts constituting the invention will be summarized.

In the drawings:

Fig. 1 is a diagrammatic plan view illustrating one embodiment of the invention as applied to a railway car brake.

Fig. 2 is a longitudinal section on a larger scale of the device used in this embodiment of the invention for producing the additional slack or idle motion in the brake rigging when braking at the lower leverage ratio. This view shows the parts in position when braking at the higher leverage ratio.

Fig. 3 is a diagrammatic plan view illustrating another embodiment of the invention as applied to a railway car brake.

Fig. 4 is a plan view on a larger scale, partially in section, which illustrates one way of combining the device for producing the additional slack or idle motion in the brake rigging with an automatic slack adjuster of the single-acting screw and nut type.

Fig. 5 is a plan view likewise on a larger scale and partially in section of a single-acting automatic slack adjuster including means for producing the additional slack or idle motion in the brake rigging when the variable leverage mechanism is set on the lower leverage ratio.

Figs. 6 and 7 are views illustrating a detail of the device according to Fig. 5 and showing this detail in different positions.

Fig. 8 is a detail end view and cross section of parts substantially on the line VIII—VIII in Fig. 5.

Referring to Fig. 1, I designates the brake cylinder, 2 the brake levers, and 3 and 4 connection rods between said levers, which are operative for bringing about the higher and the lower leverage ratio, respectively, the variable leverage mechanism for changing over from any one of said leverage ratios to the other being shown at 5. This mechanism may be of the type shown and described in British patent specification No. 426,779, and setting of this mechanism on the higher or lower leverage ratio is performed manually by means of crank handles 6 disposed at both sides of the car as usual and connected with the variable leverage or empty and load mechanism 5 by suitable motion transmitting members which it is unnecessary to describe here since they form no part of the present invention. The mechanism 5 includes, in a well known manner, a shiftable abutment which when the crank handles 6 are turned over is moved in or out of an active position in which the abutment serves to reduce the play or idle motion provided for in the connection rod 4 determining the lower leverage ratio, so that this connection rod at the braking operation can take over the transmission of the braking power and permit the connection rod 3 determining the higher leverage ratio to move idly due to the play or idle motion provided for in this last mentioned connection rod as shown at 8. The said shiftable abutment in the mechanism 5, which it is unnecessary to describe here as it is well known in the art, in this case preferably is adapted, when in its active position, to reduce the idle motion provided for in the connection rod 4 sufficiently for this connection rod to become operative at the braking operation already when the brake piston has travelled a distance considerably smaller than the distance of travel required for moving the brake shoes in contact with the wheels when the slacks between the brake shoes and the wheels in the released position of the brake are of normal value. In one of the main pull rods 9 connected to the free ends of the brake levers 2 there is provided a device 10 for producing the hereinbefore mentioned additional slack or idle motion in the brake rigging when the variable leverage mechanism 5 is set on the lower leverage ratio.

According to the embodiment of the invention illustrated in Fig. 2 this device 10 connects the two parts 9a, 9b of a pull-rod 9, the part 9a being provided with a spring housing 11 in which the other rod part 9b is slidable within certain limits. The spring 12 in the housing 11 tends to move the two rod parts towards each other but is calculated to yield for the stresses arising in the pull rod at braking. The two rod parts are adapted to be locked together by means of catches 13 pivotally mounted on the housing 11 and biased in the position shown in Fig. 2 by springs 14, the rod part 9b being provided with a collar 15 for cooperation with the said catches 13 which are releasable from their engagement with the collar 15 against the action of the springs 14 by means of a conical sleeve 16 which is slidable on the rod part 9a and acts upon the projecting arms 7 on the said catches, when it is moved towards the housing 11. The sleeve 16 is connected by means of a rod 17 (Fig. 1) to a bell crank lever 18 pivotally mounted at the free end of the adjacent brake lever 2 and operatively connected to the setting means for the variable leverage mechanism 5, so that the sleeve 16 is moved in the direction for releasing the catches 13 from engagement with the collar 15 when the variable leverage mechanism by manipulation of the crank handles 6 is set on the lower leverage ratio, whereas the sleeve 16 is moved back to permit the catches 13 to engage the collar 15 when the variable leverage mechanism by manipulation of the crank handles 6 is set on the higher leverage ratio. Preferably there may be provided, for instance in the rod 17, a resilient device 19 which yields if the crank handles 6 are turned over for setting the mechanism 5 on the lower leverage ratio when the brake is applied and, consequently, the catches 13 jammed. Said device 19 will then, due to its resiliency, move the sleeve 16 in the direction for releasing the catches 13 as soon as the stresses in the brake rigging, which caused the catches 13 to be jammed, cease at the release of the brake. It will be understood that the slack or idle motion provided for in the pull rod 9 by means of the device 10 is present only when braking at the lower leverage ratio, whereas it is done away with when braking at the higher leverage ratio. Through the presence of this additional slack or idle motion in the brake rigging only when braking at the lower leverage stage the same, or nearly the same, brake piston travel is maintained when braking at the lower leverage ratio as when braking at the higher leverage ratio if the said slack or idle motion is given the proper value.

In the embodiment of the invention illustrated in Fig. 3 the device 10 for producing the additional slack or idle motion when braking at the lower leverage ratio is disposed in the main pull rod 9 connected to the free end of the live brake lever 2a. For throwing in and out the said additional slack or idle motion there is provided a shaft 20 rotatably journaled at the free end of the dead brake lever 2b. Preferably the journal 21 for the shaft 20 may be provided on a bracket or extension 22 on the end of the main pull rod 9 connected to the dead lever 2, as is shown in Fig. 5. The shaft 20 is provided with collars 23 on both sides of the journal 21 for preventing axial displacement of the shaft 20 in relation to the journal 21. The shaft 20 is provided with a crank arm 24 operatively connected to the setting means for the variable leverage mechanism 5.

According to the embodiment of the additional slack or idle motion device shown in Fig. 4 this device is of the same general character as that shown in Fig. 2, but combined with an automatic slack adjuster 47 of the screw and nut type for reducing the slacks if they are too large. Such type of automatic slack adjuster is shown in Patents Nos. 1,773,033 and 1,439,730. On the fastening eye of this slack adjuster there is provided a bracket 48 having a screw threaded hole for a screw threaded hollow spindle 49. The shaft 20 projects into this spindle and is axially slidable relatively thereto, a key 50 or the like being provided for causing the spindle to follow rotation of the shaft. When changing the variable leverage mechanism from any of the different leverage ratio positions to the other the shaft 20 and, consequently, the spindle 49 is rotated in one direction or the other, whereby the spindle 49 is screwed forth or back in relation to the bracket 48. The conical sleeve 16 is operated by this axial movement of the spindle 49 and is provided for this purpose with an arm 51 engaged between two abutments 52 and 53 on the spindle, the abutment 52 being fixed to the spindle and the abutment 53 being axially slidable relatively thereto and actuated by a spring 54 which bears against a fixed abutment 55 on the spindle 49. The collar 15 in this embodiment is constructed and serves as the operating nut of the slack adjuster and for this purpose is splined to the housing 11 so as to partake in the rotation thereof caused by operation of the slack adjuster.

According to the embodiment of the invention illustrated in Fig. 5 the additional slack or idle motion device is provided for in combination with an automatic slack adjuster of another type operating automatically in dependence upon the brake piston travel for reducing the slacks between the brake shoes and the wheels if said slacks are too large. The slack adjuster in this case is of the type comprising two rod parts (9a, 9b) interconnected by means of a coupling clamp (25, 27) and a compensating clamp (26, 28) which latter, if the brake piston travel at a braking operation exceeds a predetermined value, is displaced against the action of a spring (32) relatively to the coupling clamp in order to be returned by the spring at the release of the brake and thereby to effect the desired reduction of the slacks. In the construction shown the rod part 9a is screw threaded and provided with two conical clamping nuts 25 and 26 split into segments and expandible against the action of surrounding springs or the like. Said nuts 25 and 26 are housed in conical housings 27 and 28 respectively. The housing 27 is fixed to the rod part 9b, and the other housing 28 is axially slidable on the rod part 9a and is operated by abutments 29 and 30 on the rod or shaft 20 which passes through an ear 31 on the housing 28. The abutment 29 is of the form shown in Figs. 6 and 7. When the variable leverage mechanism is set on the higher leverage ratio the abutment 29 takes the angular position shown in Fig. 6. When setting the variable leverage mechanism on the lower leverage ratio the shaft 20 is rotated about 90°, so that the abutment 29 takes the angular position shown in Fig. 7.

In released position of the brake, in which the housings 27 and 28 abut each other under the action of the spring 32 interposed between them, an abutment flange 36 on the housing 28 prevents the conical nut 25 from abutting its conical seat in the housing 27. Therefore, when braking, the rod part 9a to begin with will be taken along by the rod part 9b through the intermediary of the spring 32 and the conical nut 26 which will abut its conical seat in the housing 28 and thereby is prevented from expanding out of engagement with the threaded rod part 9a. At the occurrence of sufficient stresses in the pull rod 9a, 9b the spring 32 yields so that the conical nut 25 can abut its conical seat in the housing 27, and then the braking stresses are transmitted from the rod part 9b to the rod part 9a directly by means of the nut 25.

If at a braking operation at the higher leverage ratio the application stroke of the brake piston exceeds its normal value due to the slacks between the brake shoes and the wheels being too large, the abutment 29 on the shaft 20 strikes an abutment 33 on the housing 28 and moves the latter axially against the action of the spring 32, and thereby the compensating nut 26 becomes free from its conical seat in the housing 28, so that the said nut 26 can expand out of engagement with the screw thread on the rod part 9a and be displaced a certain distance on the rod part 9a. When the brake is then released a corresponding displacement also of the coupling nut 25 on the rod part 9a will take place in a well known manner for reducing the slacks between the brake shoes and the wheels. When setting the variable leverage mechanism 5 on the lower leverage ratio the rotation of the shaft 20 effected thereby serves to release a locking mechanism for a slidable sleeve 34 on the rod part 9a. This locking mechanism consists of an abutment 37 on the sleeve 34, which abuts an arm 38 pivoted to an ear 39 on the housing 28 and provided with a pivoted detent 40 engaging an abutment 41 on the housing 28. The release of this locking mechanism for the sleeve 34 is effected by an abutment rib 42 which is provided on the shaft 20 and which at the said rotation of the shaft 20 temporarily actuates a strap 43 suspended from the detent 40 whereby the latter is released against the action of a spring 40a. After the actuation of the strap 43 the rib 42 disengages itself from the strap 43 before the shaft 20 attains its end position at the said rotation of the same, and the strap 43 is then raised again by the action of the spring 40a. At the said release of the sleeve 34 this sleeve is moved towards the nut 26 by a spring 35 interposed between the sleeve and the housing 28. Hereby the nut 26 is prevented from abutting its conical seat in the housing 28 during the application movement of the brake when braking at the lower leverage ratio and, therefore, the rod part 9a can slide through the nut 26. As a consequence hereof the spring 32 can maintain the housing 28 in the normal position relatively to the housing 27, in which position the nut 25 is prevented by the abutment flange 36 on the housing 28 from abutting its conical seat in the housing 27. The rod part 9a, therefore, can slide or move idly through both the nuts 25 and 26 and will immediately do so if the frictional resistance against movement of the brake shoes for taking up the shoe clearance is sufficient for causing the said nuts 25 and 26 to be expanded against the action of their surrounding springs 25a and 26a, respectively. The additional slack or idle motion thus obtained is limited, however, when the brake piston travel reaches a predetermined value, by the fact that the abutment 29 which in this case takes the position shown in Fig. 7 and, consequently, can pass the abutment 33, strikes the ear 31 and prevents the housing 28 from continuing its movement together with the housing 27. Consequently, the housings 27 and 28 will be relatively moved apart from each other under yielding of the spring 32, whereby the abutment flange 36 is positively moved away from the nut 25 so that the nut 25 can abut its conical seat in the housing 27 and thereby clamp the rod part 9a to the rod part 9b so that thereafter movement of the brake shoes for taking up the brake shoe clearance and then actual braking can take place. If the frictional resistance against movement of the brake shoes is unsufficient for causing the nuts 25 and 26 to be expanded against the action of their surrounding springs 25a and 26a, the nuts 25 and 26 will not be so expanded and, consequently, the desired additional idle motion of the rod part 9a through the nuts 25 and 26 will not take place, until the shoe clearance has been taken up. Also in this case the additional idle motion is limited by abutment 29 abutting the ear 31 as above described.

For returning the sleeve 34 and the described locking mechanism therefor to normal position at the release of the brake there is provided an arm 44 pivoted to the free end of the arm 38 and so arranged that when braking the hook-like free end of the arm 44 falls in behind a tooth 45 on the housing 27 and is then actuated by this tooth during the release movement of the brake, towards the end of which the arm 44 through coaction with an edge 46 on the housing 28 is lifted with its free end back again over the tooth 45. After the sleeve 34 and the locking mechanism have been returned to normal position in this manner, no repeated release of the locking mechanism takes place as long as the variable leverage mechanism remains on the lower leverage and, therefore, the slack adjuster will then operate just as hereinbefore described for maintaining the braking stroke of the brake piston at a constant value which corresponds to the distance between the abutment 29 and the ear 31 in the released position of the brake. Preferably this distance should be given such a value that it corresponds to the same braking stroke of the brake piston when braking at the lower leverage ratio as does the distance between the abutment 29 and the abutment 33 when braking at the higher leverage ratio.

What I claim and desire to secure by Letters Patent is:—

1. In a vehicle brake, especially a railway car brake, a brake rigging of the variable leverage type, including a variable leverage mechanism, means for setting said mechanism on different leverage ratios, and a device provided in the brake rigging and operatively connected to the setting means for the variable leverage mechanism and adapted to produce an additional slack in the brake rigging, when the variable leverage mechanism is set on a lower leverage ratio.

2. In a vehicle brake of the character described, including a brake rigging of the variable leverage type, and means for setting the brake rigging on different leverage ratios, a rod forming part of the brake rigging and made in two relatively slidable parts, and a releasable catching mechanism for interconnecting said rod parts, said catching mechanism being operatively connected to the said means for setting the brake rigging on different leverage ratios so that the said catching mechanism is released when the brake rigging is set on a lower leverage ratio and is engaged when the brake rigging is set on a higher leverage ratio.

3. In a vehicle brake as claimed in claim 2, a spring interposed between the two relatively slidable rod parts and adapted at the release of the brake after braking at the lower leverage ratio to return the rod parts to normal position in relation to each other, in which they are adapted to be locked together by the catching mechanism.

4. In a vehicle brake as claimed in claim 2, the additional features that the catching mechanism consists of catches pivotally mounted on one of the rod parts and adapted to engage a collar or the like on the other rod part, and that said catches are releasable from their engagement with the said collar or the like by means of a sleeve slidable on one of said rod parts and operatively connected to the means for setting the brake rigging on different leverage ratios so as to be moved in a direction for releasing the catches at the setting of the brake rigging on the lower leverage ratio.

5. In a vehicle brake as claimed in claim 1, the additional feature that the device for producing the additional slack in the brake rigging at the setting of the variable leverage mechanism on the lower leverage ratio is disposed in an automatic slack adjuster which forms part of the brake rigging and which divides a brake rod into two parts.

6. In a vehicle brake of the character described, including a brake actuator, a brake rigging of the variable leverage type, an automatic slack adjuster which forms part of the brake rigging and is of the type comprising two rod parts interconnected by means of a coupling clamp and a compensating clamp which latter, if the movement of said actuator at a braking operation exceeds a predetermined value, is displaced against the action of a spring relatively to the coupling clamp in order to be returned by the spring at the release of the brake and thereby to effect a desired reduction of the slacks, means connected with said compensating clamp for holding, in the normal position thereof, the coupling clamp in an inactive state, releasable means adapted to be released at setting of the brake rigging at a lower leverage ratio and, when released, to hold the compensating clamp in an inactive state, so that in such a case neither the coupling clamp nor the compensating clamp prevents relative displacement of the rod parts until the compensating clamp, when the movement of said actuator at a braking operation exceeds the predetermined value, is displaced relatively to the coupling clamp and thereby permits the latter to become active.

7. In a vehicle brake as claimed in claim 6, the additional feature that the said releasable means for holding, in its released state, the compensating clamp in an inactive state is so arranged that at the displacement of the coupling clamp relatively to the compensating clamp at the release of the brake the said means is positively returned in its normal inactive position so that said means is put into action only at the first braking operation after the setting of the brake rigging on the lower leverage ratio.

BERT HENRY BROWALL.